United States Patent [19]
Ooka et al.

[11] Patent Number: 4,696,975
[45] Date of Patent: Sep. 29, 1987

[54] ROOM TEMPERATURE-CURABLE RESIN COMPOSITION

[75] Inventors: Masataka Ooka, Nara; Yaeko Okuda, Hyogo; Motoyasu Kunugiza, Nishinomiya, all of Japan

[73] Assignee: Dainippon Ink and Chemicals, Inc., Tokyo, Japan

[21] Appl. No.: 766,679

[22] Filed: Aug. 16, 1985

Related U.S. Application Data

[63] Continuation of Ser. No. 576,892, Feb. 3, 1984, abandoned.

[30] Foreign Application Priority Data

Feb. 4, 1983 [JP] Japan ................................ 58-17192

[51] Int. Cl.$^4$ .......................... C08F 8/46; C08L 63/10
[52] U.S. Cl. .................................. 525/113; 525/117; 525/119
[58] Field of Search ............................... 525/113, 117

[56] References Cited

U.S. PATENT DOCUMENTS 3,954,898  5/1976  Hirota et al. ..................... 525/113
3,985,928 10/1976  Watanabe et al. ................ 525/113

OTHER PUBLICATIONS

Hackh's Chemical Dictionary, Julius Grant, McGraw-Hill Book Co., New York, N.Y., 4th Edition, 1969, pp. 35 & 667.

Primary Examiner—John C. Bleutge
Assistant Examiner—Robert E. L. Sellers, II
Attorney, Agent, or Firm—Sherman and Shalloway

[57] ABSTRACT

A resin composition curable at room temperature and useful, for example, as a coating agent, an adhesive and a sealing agent. The composition consists essentially of (A) a polymer having both carboxyl and tertiary amino groups, the polymer being the reaction product of (a-1) a vinyl polymer having both carboxylic anhydride and carboxyl groups with (a-2) a compound having both at least one group containing an active hydrogen capable of reacting with the carboxylic anhydride group in the polymer (a-1) and at least one tertiary amino group, and (B) a polyepoxy compound.

17 Claims, No Drawings

ROOM TEMPERATURE-CURABLE RESIN COMPOSITION

This application is a continuation, of application Ser. No. 576,892, filed Feb. 03, 1984, now abandoned.

This invention relates to a novel and useful resin composition curable at room temperature. More specifically, this invention relates to a resin composition comprising a polymer having specified functional groups and a polyepoxy compound as essential components and having superior curability at room temperature, which is useful, for example, as a coating agent, an adhesive and a sealing agent.

In recent years, acrylic lacquers or polyisocyanate-curable urethane paints have come into widespread use as room temperature curable paints having good weatherability. The acrylic lacquers have the advantage of low cost, but coated films from these lacquers have inferior properties to those obtained from crosslinkable paints. The latter urethane paints have excellent film properties, but are not entirely satisfactory because of their toxicity ascribable to the isocyanate and their high price. Neither of these materials can therefore be said to be industrially feasible.

With the foregoing background, research and development work has been actively undertaken for new curing systems, but no room temperature curable paint having satisfactory properties has yet been obtained.

The present inventors made extensive investigations in view of the above circumstances, and previously filed a patent application on an invention relating to a room temperature curable composition comprising a vinyl polymer having a carboxylic anhydride group, an epoxy compound and a compound containing both an active hydrogen-containing group and a tertiary amino group in one molecule (Japanese Laid-Open Patent Publication No. 92,911/1981). The composition thus proposed has excellent curability and film properties and is inexpensive, but has the disadvantages that in preparing a paint, the above three essential components should be mixed, and the pot life of the composition is short.

A resin composition comprising a polyepoxy compound and a vinyl polymer obtained by copolymerizing a monomer containing a carboxyl group and a monomer containing a tertiary amino group has been known. Since, however, the vinyl polymer is heavily colored during preparation, the composition has the defect that when it is used as a clear paint, yellowing of a coated film therefrom becomes conspicuous to degrade its commercial value.

The present inventors have extensively worked in order to remove these various defects or disadvantages of the prior art products. This work has now led to the discovery that a resin composition being completely free from the various defects or disadvantages stated above and capable of giving cured products having gasoline resistance as well can be obtained by using as a basic resin component a polymer having both carboxyl and tertiary amino groups introduced into its side chain which is obtained by reacting a vinyl polymer containing both carboxylic anhydride and carboxyl groups with a compound containing both a group containing an active hydrogen capable of reacting with the carboxylic anhydride group of the vinyl polymer and a tertiary amino group.

Thus, according to this invention, there is provided a resin composition curable at room temperature consisting essentially of (A) a polymer having both carboxyl and tertiary amino groups, the polymer being the reaction product of (a-1) a vinyl polymer having both carboxylic anhydride and carboxyl groups with (a-2) a compound having both at least one group containing an active hydrogen capable of reacting with the carboxylic anhydride group in the polymer (a-1) and at least one tertiary amino group, and (B) a polyepoxy compound.

The vinyl polymer (a-1) having both carboxylic anhydride and carboxyl groups, as used herein, denotes a polymer obtained by copolymerizing a monomer having an acid anhydride group such as maleic or itaconic anhydride; a monomer having a carboxyl group, for example an unsaturated mono- or dicarboxylic acid such as acrylic, methacrylic, crotonic, itaconic, maleic or fumaric acid, a monoalkyl ester of an unsaturated dicarboxylic acid such as maleic, fumaric or itaconic acid, or an adduct of a hydroxyl-containing vinyl monomer, an acid anhydride such as succinic or trimellitic anhydride and another vinyl monomer copolymerizable with the aforesaid monomers.

Typical examples of the copolymerizable other vinyl monomer include methacrylic esters such as methyl, ethyl, butyl, lauryl, benzyl and cyclohexyl methacrylates; acrylic esters such as methyl, ethyl, butyl, lauryl, benzyl and cyclohexyl acrylates; dialkyl esters of unsaturated dibasic acids such as itaconic, maleic and fumaric acids; aromatic unsaturated hydrocarbons such as styrene, alpha-methylstyrene and vinyltoluene; and other vinyl compounds such as vinyl acetate, acrylonitrile, methacrylonitrile, acrylamide, methacrylamide, diacetone acrylamide, N,N-dimethyl acrylamide, N-vinylpyrrolidone and vinyl chloride.

In view of the curability, water resistance and alkali resistance of the resin composition to be finally obtained, the preferred amount of the carboxylic anhydride group-containing monomer is 1 to 20% by weight, and the preferred amount of the carboxyl group-containing monomer is 1 to 15% by weight. The amount of the other copolymerizable monomer is preferably 98 to 65% by weight.

The vinyl polymer (a-1) may be prepared from the monomers described above by any conventional method, particularly by a solution radical polymerization method which can be carried out by using solvents, for example aromatic hydrocarbons such as toluene and xylene, aliphatic hydrocarbons such as hexane, heptane and cycloaliphatic hydrocarbons such as cyclohexane, esters such as ethyl acetate, butyl acetate and ethylene glycol monomethyl ether acetate, or ketones such as acetone, methyl ethyl ketone, methyl isobutyl ketone and cyclohexanone, and conventional polymerization initiators such as azo compounds and peroxide compounds. The polymerization may also be carried out in the presence of a molecular weight controlling agent, for example alpha-methylstyrene dimer or mercaptans such as t-dodecylmercaptan, laurylmercaptan, alkyl thioglycolates and beta-mercaptopropionic acid.

The compound (a-2) containing both at least one group containing an active hydrogen capable of reacting with the carboxylic anhydride group (to be referred to as the active hydrogen-containing group) and at least one tertiary amino group, as used herein, denotes a compound having such an active hydrogen-containing group as a hydroxyl group, a primary or secondary amino group, or a thiol group. Alcohols containing tertiary amino groups and primary or secondary amines containing tertiary amino groups are most preferred. Adducts of secondary amines and epoxy compounds are typical examples of the tertiary amino group-containing alcohols. Typical examples of the secondary amines are dimethylamine, diethylamine, dipropylamine, dibutylamine, ethylenimine, morpholine, piperazine, piperidine, pyrrolidine, secondary amino group-containing aminoalcohols obtained by addition reaction between primary amines such as methyl, ethyl or butylamine and mono- or polyepoxy compounds. On the other hand, typical examples of the epoxy compounds include ethylene oxide, propylene oxide, butylene oxide, dodecene oxide, styrene oxide, cyclohexane oxide, butyl glycidyl ether and phenyl glycidyl ether; monoepoxy compounds such as glycidyl p-t-butylbenzoate and "Cardura E-10" (a glycidyl ester of a branched fatty acid made by Shell Chemical Co., Netherlands); polyglycidyl ethers of polyhydric alcohols, such as ethylene glycol diglycidyl either, neopentyl glycol diglycidyl ether, 1,6-hexanediol diglycidyl ether, a diglycidyl ether of bisphenol A and a triglycidyl ether of glycerol; polyglycidyl esters of polycarboxylic acids such as diglycidyl phthalate, diglycidyl isophthalate and diglycidyl adipate; epoxy resins of the bisphenol A or F diglycidyl ether type, novolak-type epoxy resins and hydantoin ring-containing epoxy resins; glycidyl ester ether of p-hydroxybenzoic acid; and vinyl polymers having an epoxy group in the side chain.

Thus, illustrative of the tertiary amino group-containing alcohols obtained by reacting the secondary amines with the epoxy compounds are dimethylaminoethanol, diethylaminoethanol, di-n-propylaminoethanol, diisopropylaminoethanol, di-n-butylaminoethanol, N-(2-hydroxyethyl)morpholine, N-(2-hydroxyethyl)piperidine, N-(2-hydroxyethyl)pyrrolidine, N-(2-hydroxyethyl)aziridine, N,N-dimethyl-2-hydroxypropylamine, N,N-diethyl-2-hydroxypropylamine, triethanolamine, and tripropanolamine. Other examples of the tertiary amino group-containing alcohols include adducts formed between aminoalcohols such as ethanolamine or propanolamine and (meth)acrylate monomers containing a tertiary amino group such as dimethylaminoethyl (meth)acrylate and diethylaminoethyl (meth)acrylate; and vinyl polymers containing both a tertiary amino group and a hydroxyl group in the side chain obtained by copolymerizing the aforesaid tertiary amino group-containing (meth)acrylate monomers with hydroxyl-containing monomers such as beta-hydroxyethyl (meth)acrylate.

Typical examples of the aforesaid primary or secondary amines containing a tertiary amino group include N,N-dialkyl-1,3-propylenediamines such as N,N-dimethyl-1,3-propylene diamine and N,N-diethyl-1,3-propylenediamine; N,N-dialkyl-1,4-tetramethylenediamines such as N,N-dimethyl-1,4-tetramethylenediamine and N,N-diethyl-1,4-tetramethylenediamine; N,N-dialkyl-1,6-hexamethylenediamines such as N,N-dimethyl-1,6-hexamehylenediamine and N,N-diethyl-1,6-hexamethylenediamine; N-alkylpiperazines such as N-methylpiperazine and N-ethylpiperazine; and adducts formed between the aforesaid tertiary amino group-containing (meth)acrylate monomers and ethylenediamine, propylenediamine, hexamethylenediamine, piperazine, methylamine, ethylamine, butylamine or ammonia.

In view of the curability of the resin composition to be finally obtained, N,N-dialkylaminoethanols or N,N-dialkylaminopropylamines are preferred as the compound (a-2).

The polymer (A) as a basic resin component in the resin composition of the invention may be prepared by mixing the compounds (a-1) and (a-2) in such proportions that there are about 0.5 to 3 equivalents of the active hydrogen-containing group in the compound (a-2) per equivalent of the acid anhydride group in the compound (a-1), and reacting them at a temperature ranging from room temperature to about 120° C.

When a compound containing both a tertiary and a primary amino group, such as N,N-dimethylaminopropylamine, is used as the compound (a-2), a polymer [I] having a carboxyl group and an N-monosubstituted amide group is first obtained by the addition reaction between the compounds (a-1) and (a-2) as schematically shown below. The polymer [I] can be directly used as the polymer (A) in this invention. But for uses which require the soiling resistance or alkali resistance of coated films, it is preferred to dehydrocyclize the polymer [I] at a temperature of about 70° to 120° C. and use the resulting imide ring-containing polymer [II] as the polymer (A).

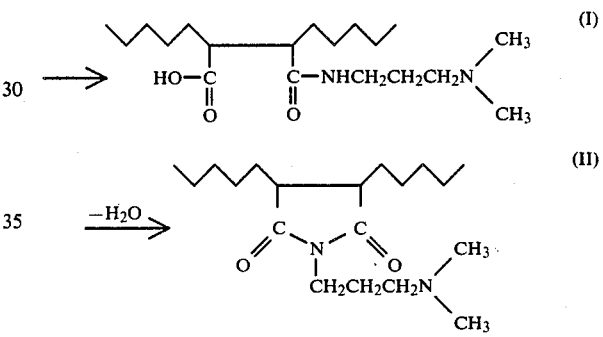

The resin composition of this invention is obtained by blending the resulting polymer (A) with the polyepoxy compound (B). As the polyepoxy compounds (B), the epoxy compounds exemplified hereinabove except the monoepoxy compounds can be used.

In view of the curability of the resin composition, the blending ratio between the components (A) and (B) is preferably such that there are 0.5 to 2 equivalents of epoxy groups in the polyepoxy compound (B) per equivalent of the total functional groups (the carboxyl groups, tertiary amino groups and unreacted acid anhydride groups) contained in polymer (A).

The resulting resin composition of the invention may be directly used as a paint. Or as required, it may be formulated into a paint by adding a pigment, a solvent, or a resin such as cellulose acetatebutyrate, nitrocellulose, a ketone resin, a chlorinated polyolefin, a polyisocyanate, or a blocked polyisocyanate.

When the coating composition prepared from the resin composition of this invention is coated on a substrate and left to stand for 1 to 2 days at room temperature or as required, dried at 60° to 100° C. for 20 to 40 minutes, a fully cured coated film having excellent properties can be obtained.

In particular, a clear paint prepared from the resin composition of this invention causes little coloration to coated films, is much lower in cost than urethane paints, and is free from toxicity which frequently causes troubles in using the urethane paints. Accordingly, the resin composition of this invention can be effectively used in various applications in which urethane paints have heretofore been used, for example automobile repair, wood working, or coating of building materials and plastics.

The use of the resin composition of the invention is not limited to paints, and it can also be used as an adhesive or a sealing agent.

The following Referential Examples, Examples, and Comparative Examples specifically illustrate the present invention. Unless otherwise indicated, all parts and percentages are by weight.

REFERENTIAL EXAMPLE 1

Preparation of a solution of polymer (A):

A reactor equipped with a thermometer, a stirring device, a dropping funnel, a nitrogen introducing tube and a cooling tube was charged with 300 parts of toluene and 400 parts of butyl acetate, and the mixture was heated to 110° C. in an atmosphere of nitrogen. Subsequently, a mixture composed of 200 parts of styrene, 300 parts of methyl methacrylate, 300 parts of n-butyl methacrylate, 130 parts of n-butyl acrylate, 30 parts of acrylic acid, 40 parts of maleic anhydride, 10 parts of azobisisobutyronitrile (AIBN), 10 parts of t-butyl peroxyoctoate (TBPO), 5 parts of t-butyl peroxybenzoate (TBPB) and 300 parts of toluene was added dropwise over the course of 3 hours. Thereafter, the mixture was maintained at the aforesaid temperature for 15 hours to give a solution of a vinyl polymer (a-1) containing both acid anhydride and carboxyl groups and having a nonvolatile content (NV) of 50% and a number average molecular weight ($\overline{M}n$) of 10,000. This vinyl polymer will be referred to hereinbelow as vinyl polymer (a-1-1).

The temperature of the polymer solution was then lowered to 70° C., and 40 parts of N,N-dimethylaminoethanol was added. The mixture was maintained at this temperature for 5 hours, and 270 parts of n-butanol was further added. A solution of a polymer (A) having an NV of 45% and a Gardner color of less than 1 was obtained. This polymer will be referred to hereinbelow as polymer (A-1).

The reaction conversion of the acid anhydride group, measured on the polymer (A-1) by IR spectroscopy, was 88%.

REFERENTIAL EXAMPLE 2

Preparation of a solution of polymer (A):

A solution of a polymer (A) containing both carboxyl and tertiary amino groups and having an NV of 45% and a Gardner color of less than 1 [to be abbreviated as polymer (A-2)] was prepared in the same way as in Referential Example 1 except that the same amount of itaconic anhydride was used instead of maleic anhydride.

REFERENTIAL EXAMPLE 3

Preparation of a solution of polymer (A):

A solution of a vinyl polymer (a-1-2) having both acid anhydride and carboxyl groups was prepared in the same way as in Referential Example 1 except that the monomers to be copolymerized were replaced by 200 parts of styrene, 250 parts of methyl methacrylate, 340 parts of n-butyl methacrylate, 130 parts of n-butyl acrylate, 50 parts of methacrylic acid and 30 parts of maleic anhydride.

The polymer solution was then cooled to 70° C., and 40 parts of N,N-diethylaminoethanol was added. The mixture was maintained at the above temperature for 5 hours, and 270 parts of n-butanol was added to give a solution of a polymer (A) having an NV of 45% and a Gardner color of less than 1. This polymer will be referred to hereinbelow as polymer (A-3).

The reaction conversion of the acid anhydride groups, measured on the polymer (A-3) by IR spectroscopy, was 85%.

REFERENTIAL EXAMPLE 4

Preparation of a solution of polymer (A):

One thousand parts of the solution of vinyl polymer (a-1-1) having both acid anhydride and carboxyl groups obtained in Referential Example 1 was heated to 80° C. in a stream of nitrogen, and 20 parts of N,N-dimethylaminopropylamine was added. The mixture was maintained at the above temperature for 3 hours to continue the reaction. Then, 135 parts of n-butanol was added to give a solution of a polymer (A) having an NV of 45% and a Gardner color of less than 1. This polymer will be referred to hereinbelow as polymer (A-4).

REFERENTIAL EXAMPLE 5

Preparation of a vinyl polymer for comparison:

The same reactor as used in Referential Example 1 was charged with 300 parts of toluene and 400 parts of n-butanol, and the temperature was raised to 80° C. in a stream of nitrogen. Then, a mixture composed of 200 parts of styrene, 300 parts of methyl methacrylate, 300 parts of n-butyl methacrylate, 100 parts of n-butyl acrylate, 20 parts of acrylic acid, 80 parts of N,N-dimethylaminoethyl methacrylate, 10 parts of AIBN, 5 parts of TBPO and 300 parts of toluene was added dropwise over the course of 3 hours. The mixture was maintained at the above temperature for 15 hours to give a solution of a vinyl polymer (a-1) containing both tertiary amino and carboxyl groups and having an NV of 50%, a Gardner color of 5 and an $\overline{M}n$ of 13,000. This vinyl polymer will be referred to hereinbelow as vinyl polymer (a'-1-1). Clearly, the color of this polymer was extremely poor.

REFERENTIAL EXAMPLE 6

Preparation of a solution of polymer (A):

One thousand parts of the solution of vinyl polymer (a-1-1) having both acid anhydride and carboxyl groups obtained in Referential Example 1 was heated to 90° C. in a stream of nitrogen, and 20.8 parts of N,N-dimethylaminopropylamine was added. The mixture was maintained at this temperature for 6 hours to perform dehydration reaction. In the initial stage of the reaction, the polymer has an acid value of 22.7, but at the end of the reaction, it was decreased to 12.5. It is clear from this fact that about 90% of the amide group formed was converted to an imide ring.

IR spectroscopy led to the determination that the absorption of the amide group disappeared, and instead, an absorption at 1700 cm$^{-1}$ ascribable to the imide ring appeared.

To the resulting solution containing the imide ring-containing polymer was added 135 parts of n-butanol to give a solution of a polymer (A) having an NV of 45% and a Gardner color of less than 1. This polymer will be referred to hereinbelow as polymer (A-5).

REFERENTIAL EXAMPLE 7

Preparation of a solution of polymer (A):

One thousand parts of the solution of vinyl polymer (a-1-1) obtained in Referential Example 1 was heated to 70° C. in a stream of nitrogen, and 21.4 parts of 2-(N,N-dimethylamino)ethanethiol was added. The mixture was maintained at this temperature for 4 hours, and then 137 parts of n-butanol was added to give a solution of a polymer (A) having an NV of 45% and a Gardner color of less than 1. This polymer will be referred to hereinbelow as polymer (A-6).

REFERENTIAL EXAMPLE 8

One thousand parts of the solution of vinyl polymer (a-1-1) obtained in Referential Example 1 was heated to 70° C. in a stream of nitrogen, and 17.9 parts of 3-(N-methylamino)propylamine was added. The mixture was maintained at this temperature for 4 hours, and 133 parts of n-butanol was added to give a solution of a polymer having an NV of 45% and a Gardner color of less than 1. This polymer will be referred to hereinbelow as polymer (A-7).

EXAMPLES 1 TO 7 AND COMPARATIVE EXAMPLES 1 AND 2

In each run, each of the polymer solutions obtained in the foregoing Referential Examples was blended with each of the polyepoxy compounds shown in the following table in the blending proportions indicated to form a clear paint. The clear paint was then diluted to a sprayable viscosity with a mixture of toluene and n-butanol in a weight ratio of 70:30 (in Comparative Example 1, with a mixture of toluene and butyl acetate in a weight ratio of 70:30). The diluted paint was spray-coated to a film thickness of about 60 microns on a steel plate treated with zinc phosphate. The coated steel plate was left to stand at room temperature for 4 days to form a cured coated film.

The following table summarizes the pot lives of the clear paints and the properties of coated films prepared therefrom.

It is seen from the results shown in the above table that the paints prepared from the resin compositions of this invention have long pot lives and give coated films having reduced coloration and excellent properties.

The coloration of the coated film shown in the above table was evaluated by coating each of the clear paints by the same method as above on a pre-coated white urethane coating, drying the coated film at room temperature for 4 days, then immediately measuring the degree of yellowing of the coated film, and determining the difference (Δb value) of the degree of yellowing from that of a coating of urethane paint alone. Smaller Δb values mean less coloration of the coated film.

What we claim is:

1. A resin composition curable at room temperature, said composition consisting essentially of
   (A) a polymer having both carboxyl and tertiary amino groups, the polymer being the reaction product of (a-1) a vinyl polymer having both carboxylic anhydride and carboxyl groups with (a-2) a compound having both at least one group containing an active hydrogen selected from the group consisting of hydroxyl, primary amino, secondary amino and thiol and at least one basic nitrogen atom-containing group selected from the group consisting of

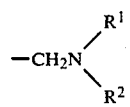

wherein $R^1$ and $R^2$, which may be the same or different, each denote a $C_{1-4}$ alkyl group or hydroxyalkyl group;

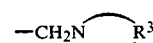

wherein $R^3$ denotes a $C_{2-5}$ alkylene group or $-CH_2CH_2OCH_2CH_2-$;

TABLE

| | | Example | | | | | | | Comparative Example | |
|---|---|---|---|---|---|---|---|---|---|---|
| | | 1 | 2 | 3 | 4 | 5 | 6 | 7 | 1 | 2 |
| Blending proportions (parts) | Solution of polymer (A-1) | 100 | | | | | | | | |
| | Solution of polymer (A-2) | | 100 | | | | | | | |
| | Solution of polymer (A-3) | | | 100 | | | | | | |
| | Solution of polymer (A-4) | | | | 100 | | | | | |
| | Solution of polymer (A-5) | | | | | 100 | | | | |
| | Solution of polymer (A-6) | | | | | | 100 | | | |
| | Solution of polymer (A-7) | | | | | | | 100 | | |
| | Solution of polymer (a-1-1) | | | | | | | | 100 | |
| | Solution of polymer (a'-1-1) | | | | | | | | | 100 |
| | N,N—dimethylaminoethanol | | | | | | | | 2 | |
| | Glycerin polyglycidyl ether (epoxy equivalent = 145) | 7.7 | | | 7.7 | | 7.7 | | 8.9 | 5.8 |
| | Diglycerin polyglycidyl ether (epoxy equivalent = 155) | | 7.6 | 8.1 | | 5.7 | | 8.3 | | |
| Properties of the coated film | Erichsen value (mm) | | | | >7 | | | | >7 | |
| | Impact strength [½ inch] (500 g × cm) | | | | >50 | | | | 40 | 20 |
| | Coloration (Δb value) | 0.3 | 0.4 | 0.3 | 0.5 | 0.3 | 0.4 | 0.3 | 0.3 | 3.0 |
| | Gasoline resistance (*1) | B | B | 2B | HB | B | B | B | Softer than 4B | |
| Pot life of the clear paint (hrs) (*2) | | 27 | 24 | 19 | 24 | 30 | 20 | 18 | 3 | 20 |

Footnote to the Table
(*1): The coated steel plate was immersed in gasoline at room temperature for 24 hours, then withdrawn, and left to stand at room temperature for 30 minutes. Then, the pencil hardness of the coated film was measured, and the gasoline resistance of the coated film was evaluated by its pencil hardness so measured.
(*2): The pot life is the time which elapsed until the clear paint having an NV of 40% gelled when it was maintained at 25° C.

and
N-C$_{1-2}$ alkylpiperazinyl group, and
(B) a polyepoxy compound.

2. The composition of claim 1 wherein the blending ratio between the polymer (A) and the polyepoxy compound (B) is such that there are 0.5 to 2 equivalents of epoxy groups in the compound (B) per equivalent of the carboxyl groups, tertiary amino groups and unreacted acid anhydride groups contained in the polymer (A).

3. The composition of claim 1 or 2 wherein the polymer (A) is a polymer having both carboxyl and N-monosubstituted amide groups.

4. The composition of claim 1 or 2 wherein the polymer (A) is a polymer having an imide ring obtained by dehydrocyclizing a polymer having both carboxyl and N-monosubstituted amide group.

5. The composition of any one of claims 1 or 2 wherein the vinyl polymer (a-1) is a copolymer of a monomer having an acid anhydride group, a monomer having a carboxyl group and a vinyl monomer being copolymerizable with said monomers.

6. The composition of any one of claims 1 or 2 wherein the compound (a-2) is a compound having both a tertiary amino group and a group containing an active hydrogen capable of reacting with the carboxylic anhydride group and being selected from the class consisting of hydroxyl, secondary amino and thiol groups.

7. The composition of any one of claims 1 or 2 wherein the compound (a-2) is an alcohol having a tertiary amino group.

8. The composition of any one of claims 1 or 2 wherein the compound (a-2) is a primary amine having a tertiary amino group.

9. The composition of any one of claims 1 or 2 wherein the compound (a-2) is a secondary amine having a tertiary amino group.

10. The composition of any one of claims 1 or 2 wherein the compound (a-2) is N,N-dimethylaminopropylamine.

11. A resin composition curable at room temperature, said composition consisting essentially of
(A) an imide ring-containing polymer of the formula

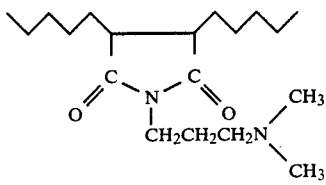

and
(B) a polyepoxy compound.

12. A room temperature curable resin composition consisting essentially of
(A) a polymer having both of carboxyl and tertiary amino groups, and which is the reaction product of (a-1) a vinyl polymer having both carboxylic anhydride and carboxyl groups and which is obtained by copolymerizing from about 1 to about 20% by weight of carboxylic anhydride group-containing monomer, from about 1 to 15% by weight of carboxyl group containing monomer, and from about 98 to 65% by weight of other copolymerizable vinyl compound monomer with (a-2) a compound having both at least one active hydrogen-containing group and at least one tertiary amino group and which is a tertiary amino group-containing alcohol, a primary amine containing a tertiary amino group, a secondary amine containing a tertiary amino group, or 2-(N,N-dimethylamino)ethanethiol, and
(B) a polyepoxy compound.

13. The composition of claim 12 wherein the vinyl polymer (a-1) is obtained by copolymerizing a carboxylic anhydride group-containing monomer selected from the group consisting of maleic anhydride and itaconic anhydride, with a carboxyl group-containing monomer selected from the group consisting of acrylic acid, methacrylic acid, crotonic acid, itaconic acid, maleic acid, fumaric acid, a monoalkylester of maleic acid, fumaric acid or itaconic acid, and an adduct of a hydroxyl-containing vinyl monomer, an acid anhydride and another vinyl monomer copolymerizable with said hydroxyl-containing vinyl monomer and said acid anhydride, and another copolymerizable vinyl compound monomer selected from the group consisting of methyl methacrylate, ethyl methacrylate, butyl methacrylate, lauryl methacrylate, benzyl methacrylate, cyclohexyl methacrylate, methyl acrylate, ethyl acrylate, butyl acrylate, lauryl acrylate, benzyl acrylate, cyclohexyl acrylate, dialkyl ester of itaconic acid, dialkyl ester of maleic acid, dialkyl ester of fumaric acid, styrene, alpha-methylstyrene, vinyl toluene, vinyl acetate, acrylonitrile, methacrylonitrile, acrylamide, methacrylamide, diacetone acrylamide, N,N-dimethyl acrylamide, N-vinyl pyrollidone and vinyl chloride.

14. The composition of claim 12 wherein the compound (a-2) is said alcohol containing a tertiary amino group which is an adduct of a secondary amine and an epoxy compound, said secondary amine being selected from the group consisting of dimethylamine, diethylamine, dipropylamine, dibutylamine, ethylenimine, morpholine, piperazine, piperidine, pyrrolidine, and secondary amino group-containing amino alcohols obtained by addition reaction between a primary amine and a mono- or polyepoxy compound, with an epoxy compound selected from the group consisting of ethylene oxide, propylene oxide, butylene oxide, dodecene oxide, styrene oxide, cyclohexene oxide, butyl glycidyl ether, phenyl glycidyl ether, glycidyl p-t-butylbenzoate, glycidyl ester of branched fatty acid, ethylene glycol diglycidyl ether, neopentyl glycol diglycidyl ether, 1,6-hexanediol diglycidyl ether, diglycidyl ether of bisphenol A, triglycidyl ether of glycerol, diglycidyl phthalate, diglycidyl isophthalate, diglycidyl adipate, epoxy resins of bisphenol A diglycidyl ether, epoxy resin of bisphenol F diglycidyl ether, novolak epoxy resin, hydantoin ring-containing epoxy resin, glycidyl ester ether of p-hydroxybenzoic acid, and vinyl polymer having an epoxy group in the side chain.

15. The composition of claim 12 wherein the compound (a-2) is the tertiary amino group-containing alcohol which is a compound selected from the group consisting of dimethylaminoethanol, diethylaminoethanol, di-n-propylaminoethanol, diisopropylaminoethanol, di-n-butylaminoethanol, N-(2-hydroxyethyl)morpholine, N-(2-hydroxyethyl)piperidine, N-(2-hydroxyethyl)pyrrolidone, N-(2-hydroxyethyl)aziridine, N,N-dimethyl-2-hydroxypropylamine, N,N-diethyl-2-hydroxpropylamine, triethanolamine, tripropanolamine, an adduct formed between ethanolamine or propanolamine and dimethylaminoethyl acrylate, dimethylaminoethyl methacrylate, diethylaminoethyl acrylate, or diethylaminoethyl methacrylate, and vinyl polymers containing both a tertiary amino group and a hydroxyl group in the side chain which are obtained by copolymerizing dimethylaminoethyl acrylate, dimethylaminoethyl methacrylate, diethylaminoethyl acrylate, or diethylaminoethyl methacrylate with beta-hydroxyethyl acrylate or beta-hydroxyethyl methacrylate.

16. The composition of claim 12 wherein the compound (a-2) is a primary or secondary amine containing a tertiary amino group selected from the group consisting of N,N-dimethyl-1,3-propylenediamine, N,N-diethyl-1,3-propylenediamine, N,N-dimethyl-1,4-tetramethylenediamine, N,N-diethyl-1,4-tetramethylenediamine, N,N-dimethyl-1,6-hexamethylenediamine, N,N-diethyl-1,6-hexamethylenediamine, N,N-methylpiperazine, N-ethylpiperazine, and adducts formed between dimethylaminoethyl methacrylate, dimethylaminoethyl acrylate, diethylaminoethyl acrylate, or diethylaminoethyl methacrylate with ethylenediamine, propylenediamine, hexamethylenediamine, piperazine, methylamine, ethylamine, butylamine, or ammonia.

17. The composition of claim 12 wherein the compound (a-2) is N,N-dialkylaminoethanol or N,N-dialkylaminopropylamine.

* * * * *